United States Patent [19]

Tokumitsu et al.

[11] Patent Number: 5,192,998
[45] Date of Patent: Mar. 9, 1993

[54] IN-FOCUS DETECTING DEVICE

[75] Inventors: Jun Tokumitsu, Kanagawa; Minoru Yoshii, Tokyo; Shigeyuki Suda, Kanagawa; Masayoshi Sekine, Tokyo, all of Japan

[73] Assignee: Canon Kabushiki Kaisha, Tokyo, Japan

[21] Appl. No.: 902,548

[22] Filed: Jun. 22, 1992

Related U.S. Application Data

[63] Continuation of Ser. No. 800,887, Nov. 27, 1991, , which is a continuation of Ser. No. 636,894, Jan. 2, 1991, abandoned.

[30] Foreign Application Priority Data

Jan. 5, 1990 [JP] Japan .................. 2-000257
Jan. 5, 1990 [JP] Japan .................. 2-000258

[51] Int. Cl.$^5$ .......................... G02B 7/36; G03B 3/10; H04N 5/232; H04N 9/64
[52] U.S. Cl. ....................... 358/41; 358/227
[58] Field of Search ........... 358/41, 43, 44, 48, 358/227

[56] References Cited

U.S. PATENT DOCUMENTS 4,998,162 3/1991 Kondo .................. 358/41

Primary Examiner—Howard W. Britton
Attorney, Agent, or Firm—Robin, Blecker, Daley & Driscoll

[57] ABSTRACT

An in-focus detecting device is arranged to detect the width of a color transition area of an object image from the color components of a video signal and to determine an in-focus state by evaluating the width.

24 Claims, 12 Drawing Sheets

FIG.11(a)
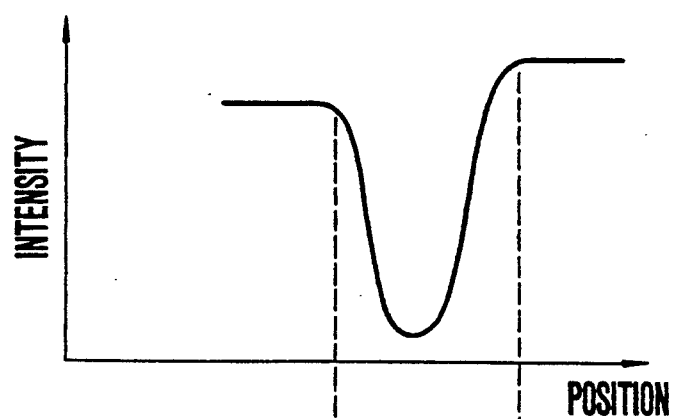
FIG.11(b)
FIG.11(c)
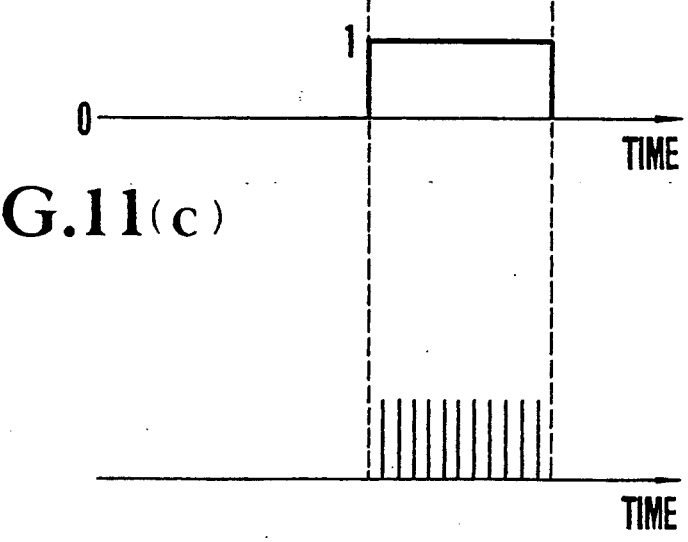

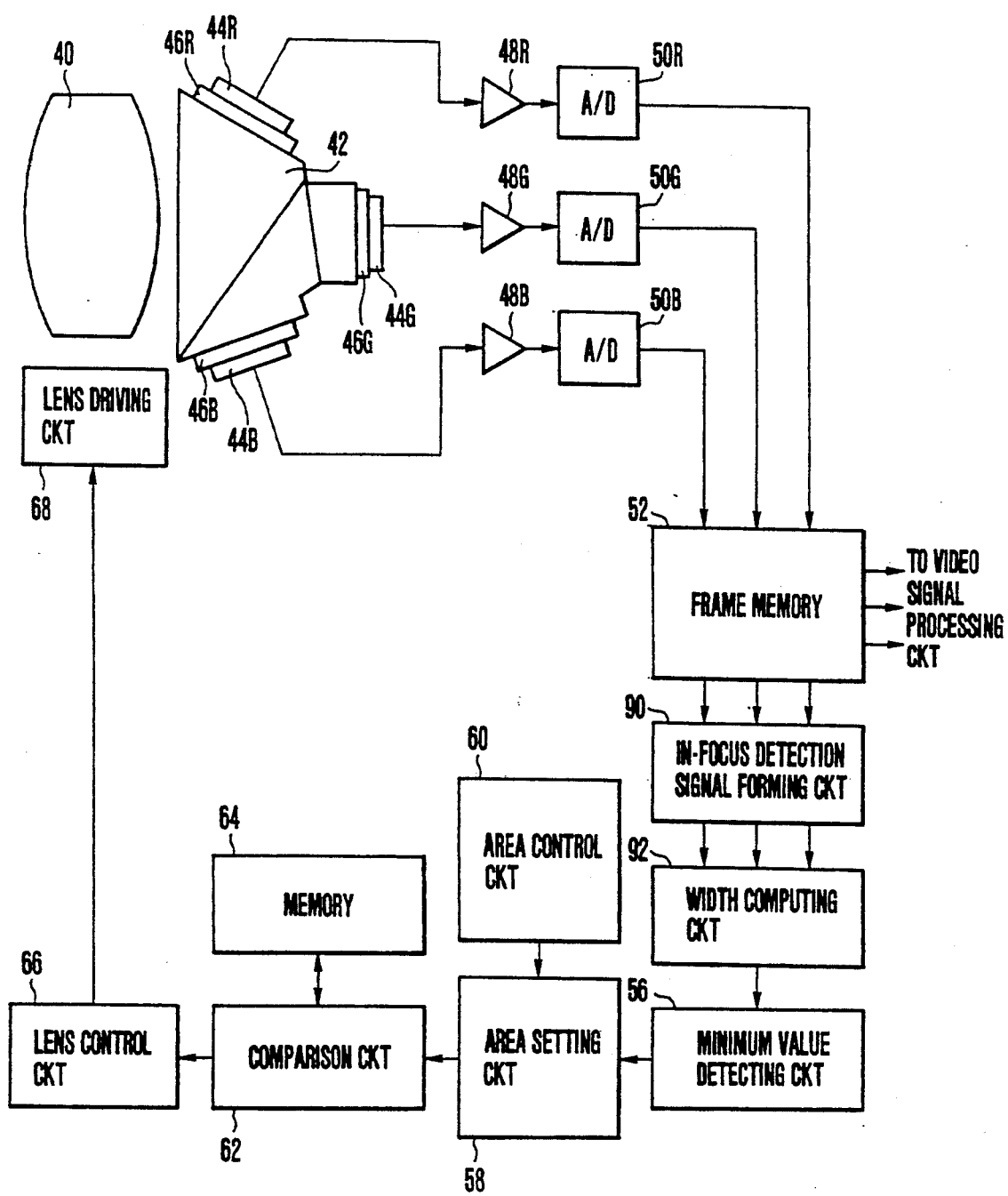
F I G.12

IN-FOCUS DETECTING DEVICE

This application is a continuation of Ser. No. 07/800,887, filed Nov. 27, 1991, now abandoned; which was a continuation of Ser. No. 07/636,894, filed Jan. 2, 1991, now abandoned.

BACKGROUND OF THE INVENTION

1. Field of the Invention

This invention relates to an in-focus detecting device for an image sensing apparatus.

2. Description of the Related Art

The conventional in-focus detecting methods for detecting the state of focus of a photo-taking lens, i.e., for detecting whether the lens is in focus, include two types. One is a passive type wherein the degree of in-focus is determined on the basis of correlation between two images formed by a twin-lens optical system. The other is an active type wherein the degree of in-focus is determined on the basis of the position of the spot of a reflected light flux obtained by illuminating a photographed object with infrared rays. Further, a method of detecting the state of focus through a video signal processing operation has been proposed as a result of recent popularization of electronic image sensing apparatuses such as video cameras, electronic still cameras, etc..

The focus detection through a video signal processing operation is based on the fact that the edge part of an image moderately varies to have a large width in the event of defocus while the width reaches a minimum value in an in-focus state. An example of this method has been disclosed in U.S. Pat. No. 4,804,831. In the case of a defocus state, signal intensity for the edge part of the image is as shown in FIG. 1(a) of the accompanying drawings. In the case of an in-focus state, the signal intensity distribution becomes as shown in FIG. 1(b). The edge width X1 obtained in the defocus state in relation to the degree d1 of change of signal intensity is computed as follows:

$$X1 = \frac{d1}{dI1(X)/dx}$$

In the above formula, "I1(X)" is a function indicating the intensity distribution of the edge part obtained when the lens is in the defocus state; and "dI1(X)/dX" represents the inclination of the edge part. A mean value of inclination values obtained from several points between a change starting point where the signal intensity starts changing or rising and a change ending point where the signal intensity ceases to rise is used as the value of above-stated inclination.

In the in-focus state, the edge width X2 which is shown in FIG. 1(b) is likewise computed as follows:

$$X2 = \frac{d2}{dI2(X)/dX}$$

In this formula, "d2" represents a difference in signal intensity between two sides of the edge part, i.e., a difference in luminance; "I2(X)" is a function indicating the intensity distribution obtained in the in-focus state; and "dI2(X)/dX" represents the inclination of the edge part. There is not much difference between "d1" and "d2". The inclination is steep in the in-focus state, that is, the width of the edge part decreases accordingly as the degree of in-focus increases. This permits in-focus detection.

In accordance with the above-stated example of the conventional method, however, it is impossible to accurately detect an in-focus state if the object has a low degree of contrast, because: In that case, the edge width of the image becomes large as a whole and the edge width obtained in the defocus state does not much differ from the edge width obtained in the in-focus state. For example, in cases where an algorithm of selecting, for in-focus detection, such an edge part that has the smallest edge width among images within a focus detecting area and is rapidly changing is used, the in-focus determination might be made on the basis of a wrong edge part during a focusing process. This would hinder an in-focus detecting action on an intended object and makes the operation of the in-focus detecting system unstable.

SUMMARY OF THE INVENTION

This invention is directed to the solution of the above-stated problem. It is, therefore, a first object of the invention to provide an in-focus detecting device which is capable of accurately detecting an in-focus state irrespectively of the state of the photographed object.

It is a second object of the invention to provide an in-focus detecting device which is capable of accurately detecting an in-focus state irrespectively of the degree of contrast of the object.

It is a third object of the invention to provide an in-focus detecting device which is capable of focusing continuously on one and the same part of an object irrespectively of changes in the photographed object.

To attain these objects, an in-focus detecting device which is arranged according to this invention as a preferred embodiment thereof comprises: detecting means for detecting a width of a color transition area of a photographed object on the basis of color components of a video signal obtained from the color transition area; and in-focus determining means for determining an in-focus state by evaluating an output of the detecting means.

It is a fourth object of the invention to provide an in-focus detecting device which is capable of accurately detecting an in-focus point by continuously computing the width of one and the same color transition area and by comparing the computed values thus obtained with each other, because every color transition area has a minimum width when it is in an in-focus state.

It is a fifth object of the invention to provide an in-focus detecting device which is capable of accurately detecting an in-focus point by stably and continuously detecting a focusing state of one and the same part of the photographed object even in the event of a low contrast object as long as its color is changing, because a normal object changes its color in the same manner in relatively few parts thereof.

To attain the above-stated objects, an in-focus detecting device which is arranged as a preferred embodiment thereof comprises: detecting means for computing a video signal obtained from a color transition area of an object sensed by image sensing means and for detecting information on a width of the color transition area; and determining means for determining an in-focus state on the basis of a change in the information on the width of the color transition area detected by the detecting means.

It is a sixth object of the invention to provide a TV camera apparatus which is capable of accurately and reliably detecting an in-focus state from information on colors included in a video signal even in cases where a photographed object is in a low contrast state.

These and other objects and features of this invention will become apparent from the following detailed description of embodiments thereof taken in conjunction with the accompanying drawings.

BRIEF DESCRIPTION OF THE DRAWINGS

FIGS. 11(a), 11(b) and 11(c) show in a timing chart the operation of the circuit arrangement of FIG. 10.

FIG. 12 is a block diagram showing the circuit arrangement of the embodiment as applied to the automatic focusing device of a TV camera.

DETAILED DESCRIPTION OF THE PREFERRED EMBODIMENTS

Figure 1A:
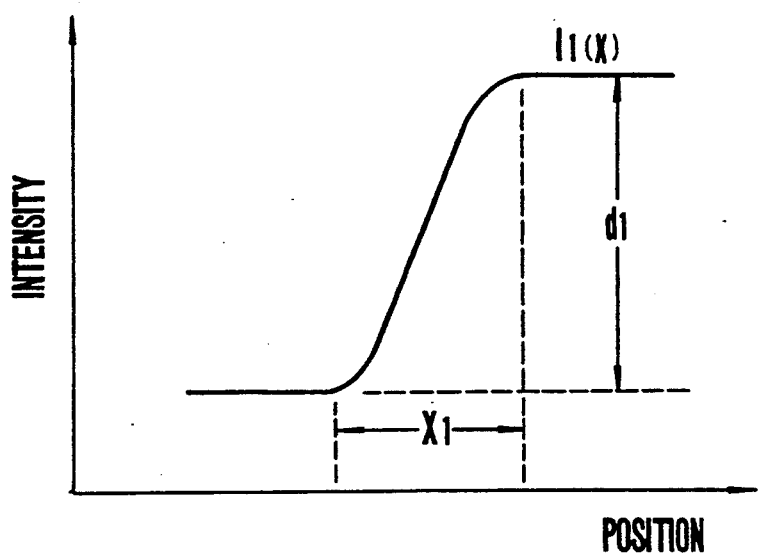
FIGS. 1(a) and 1(b) are graphs showing the principle of the conventional in-focus detecting method based on changes taking place in a luminance signal level obtained from the edge part of an object image.
Figure 1B:
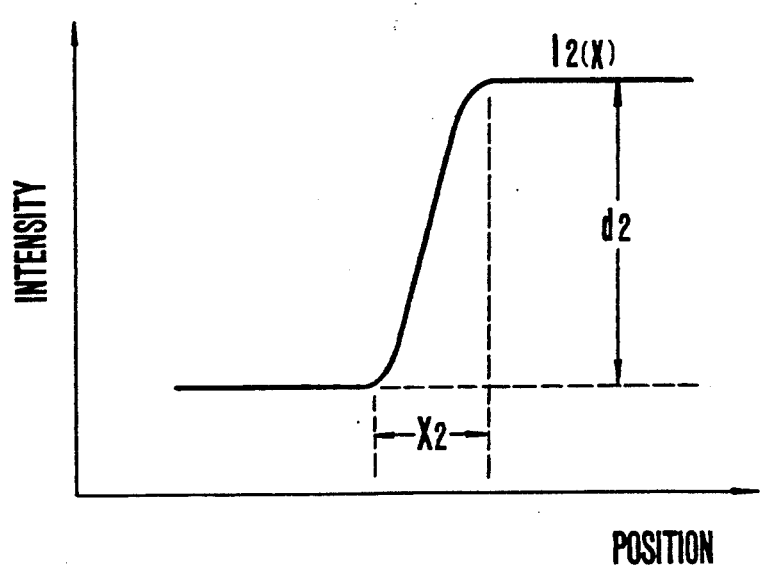
Figure 2A:
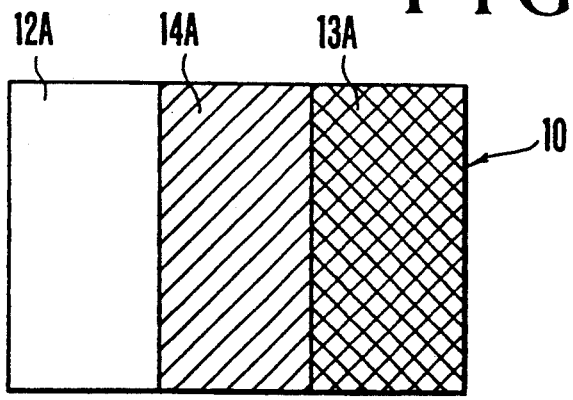
FIGS. 2A(a), 2A(b) and 2A(c) show color changing parts in a defocus state obtained by an embodiment of this invention.
Figure 2A:
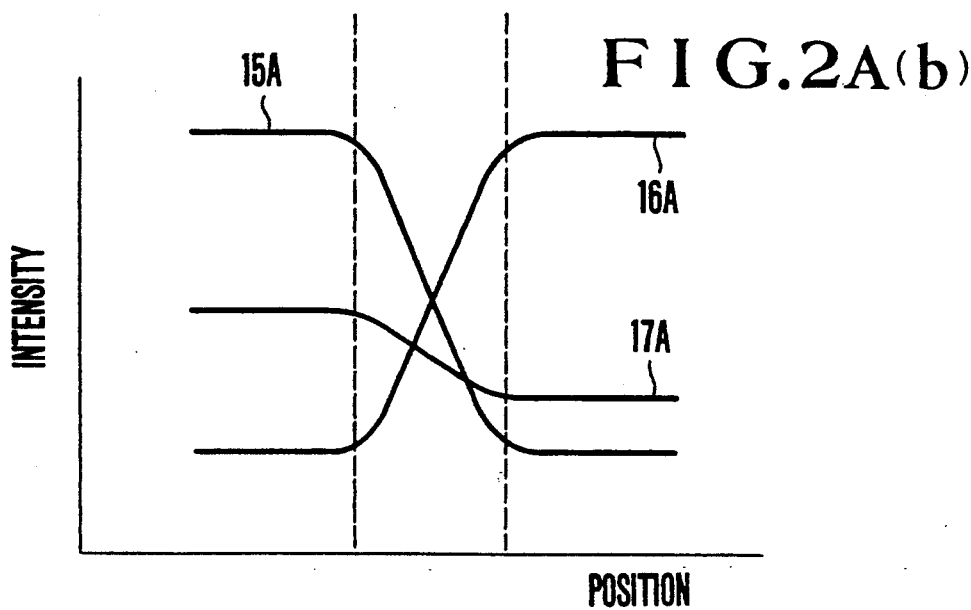
Figure 2A:
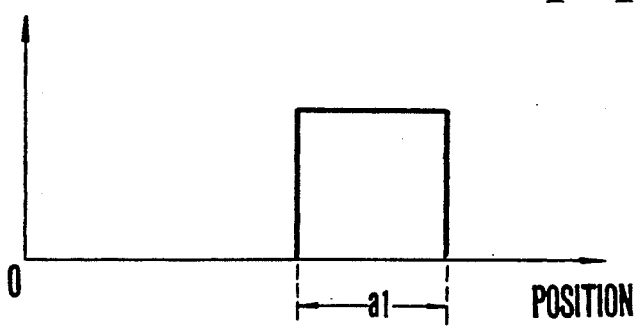
Figure 2B:
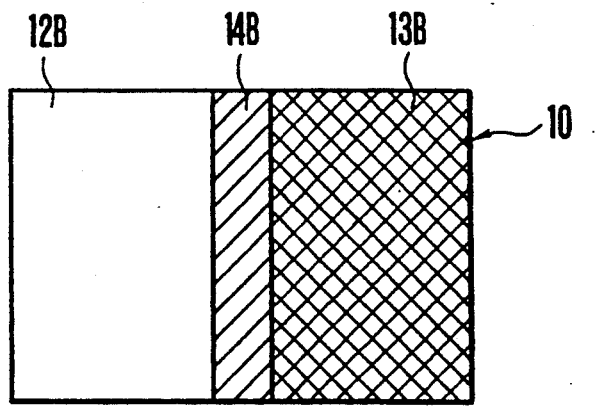
FIGS. 2B(a), 2B(b) and 2B(c) show color changing parts in an in-focus state.
Figure 2B:
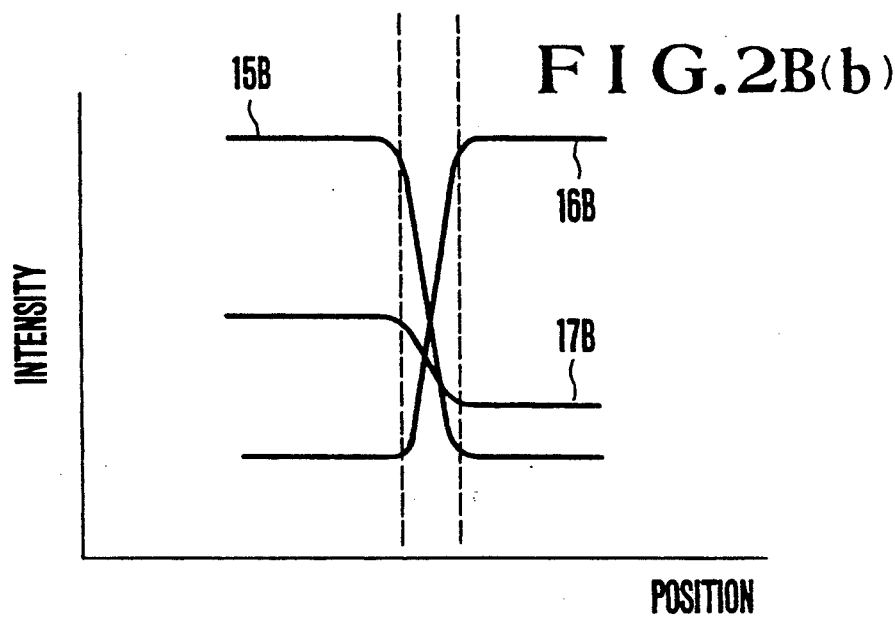
Figure 2B:
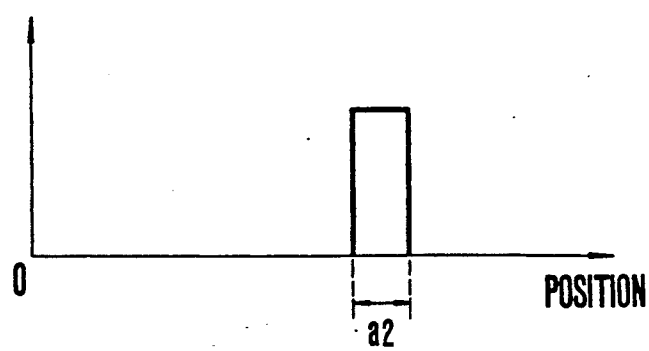

The following describes embodiments of this invention with reference to the drawings:

The basic principle of a first embodiment of the invention is described as follows: FIGS. 2A(a), 2A(b) and 2A(c) show a defocus state. FIGS. 2B(a), 2B(b) and 2B(c) show an in-focus state. The defocus state is first described. Referring to FIG. 2A(a), a reference numeral 10 denotes a distance measuring frame set for focus detection on an image sensing plane which is not shown. Numerals 12A, 13A and 14A are parts of a photographed object which are changing their colors. For example, these parts a red area 12A, a blue area 13A and a transition area 14A where its color changes from red to blue. In FIG. 2A(b), curves 15A, 16A and 17A respectively represent the red (R), blue (B) and green (G) signals included in a video signal. These R, B and G signals 15A, 16A and 17A are color components of a part of the video signal which is obtained by horizontally scanning the red area 12A, the transition area 14A and the blue area 13A. In this instance, the video signal includes a trace of the G signal. FIG. 2A(c) shows an in-focus detection signal obtained from the color components shown in FIG. 2A(b). In FIG. 2A(c), a pulse width a1 indicates the width of the transition area 14A.

In FIGS. 2B(a), 2B(b) and 2B(c) which show an in-focus state, reference numerals 12B, 13B and 14B denote respectively a red area, a blue area and a transition area where its color changes from red to blue; numerals 15B, 16B and 17B denote respectively the red (R), blue (B) and green (G) signals included in the video signal; and FIG. 2B(c) shows an in-focus detection signal obtained from the R, B and G color components shown in FIG. 2B(b). In FIG. 2B(c), the pulse width a2 of the in-focus detection signal indicates the width of the transition area 14B.

During a shooting operation with a TV camera or the like, the color components of the video signal obtained from the color changing parts of the object within the distance measuring frame 10 of the image sensing plane, such as the red area, the blue area and the transition area between them, change in such a way as shown in FIG. 2A(b). In the case of FIG. 2A(b), the areas having unvarying colors like the red and blue areas give flat signals while the transition area gives a signal which is gradually varying. The transition area is brought about by defocus blurring of the red and blue areas. Therefore, in this instance, the color of the transition area is a mixture of red and blue colors. Hence, the transition area may be called a color mixture area. Further, the color of the color mixture area is not uniform. The color becomes darker as the color location is closer to the adjoining area. An in-focus detection signal such as the signal shown in FIG. 2A(c) or 2B(c) is obtained by detecting such a color mixture area and by defining a function with a binary signal which becomes "1" for the color mixture area and "0" for other areas.

In the case of an in-focus state, the width of the transition area of the same object reaches its minimum value. Therefore, in the case of FIGS. 2A(a), 2A(b) and 2A(c) and FIGS. 2B(a), 2B(b) and 2B(c), the curves of the R and B signals come to show steep inclination at the transition area as shown in FIG. 2B(c). Therefore, an in-focus state can be attained by obtaining the width a1 or a2 of the transition area; by detecting its temporal change; and by shifting the position of a photo-taking lens to a position where the width of the transition area reaches a minimum value.

Figure 3:
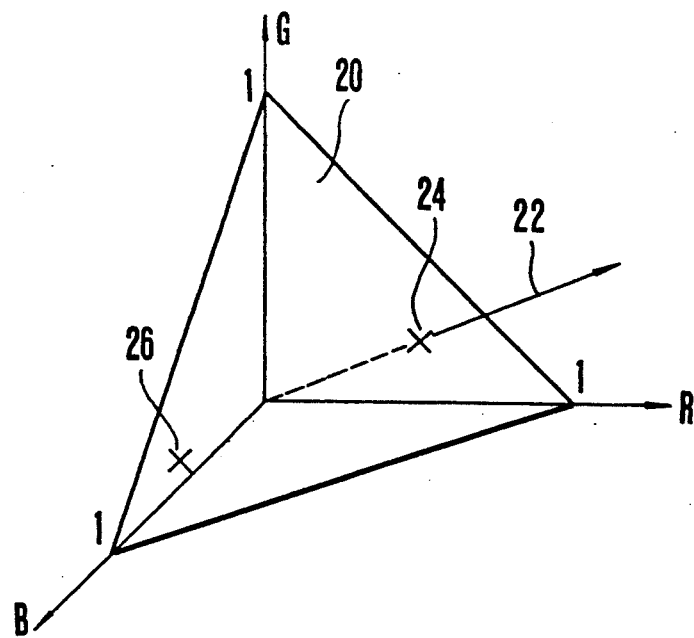
FIG. 3 is a color plane view.

FIG. 3 is a color plane view. In this figure, a reference numeral 20 denotes a color plane obtained by connecting the coordinate points of "1" of the R, G and B axes. A numeral 22 denotes a color vector which indicates one color and is determined by combining the R, G and B components. A numeral 24 denotes an intersection point between the color plane 20 and the color vector 22. The R, G and B coordinate values of the intersection point 24 become the normalized R, G and B values of the color indicated by the color vector 22. Assuming that the color vector 22 represents the color of the red areas 12A and 12B of FIGS. 2A(a) and 2B(a), the intersection point 24 represents the color of the red areas 12A and 12B obtained on the color plane 20. In the same manner as this, a point 26 corresponds to the color of the blue areas 13A and 13B as obtained on the color plane 20.

Figure 4:
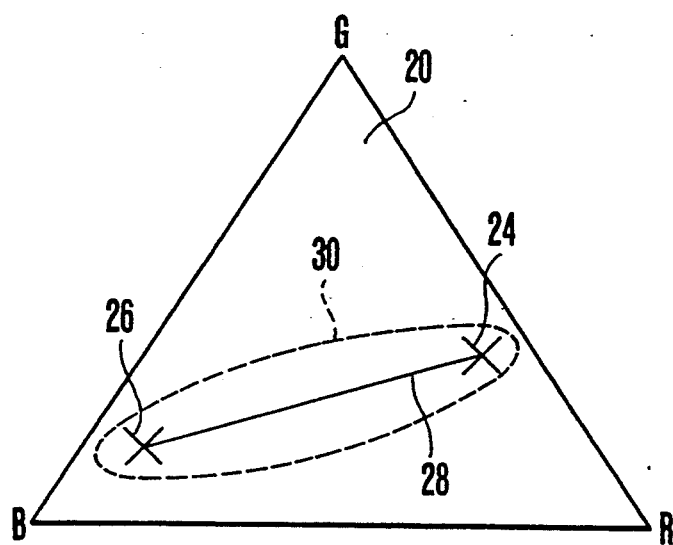
FIG. 4 shows the principle of a color mixture part detecting operation.

FIG. 4 shows the principle of the color mixture part detecting operation. In FIG. 4, only the color plane 20 extracted from FIG. 3 is shown. On the color plane 20, a color mixture obtained with two colors mixed together is located on a line connecting the positions of the original two colors. In FIG. 4, therefore, a line segment 28 connecting points 24 and 26 represents a color mixture which is obtained by mixing the color of the red area 12A or 12B with that of the blue area 13A or 13B. The color of the transition area 14A or 14B is located on this line segment 28. An area 30 encompassed with a broken line indicates a range from which the color of the red area 12A or 12B, that of the blue area 13A or 13B and that of the transition area 14A or 14B of the object shown by way of example in FIG. 2A(a) or 2B(a) are obtainable.

The relation between these colors remains unchanged also when an in-focus state is attained. It is only the spatial width of the transition area that differs between an out-of-focus state and an in-focus state.

Almost all the colors to be used are included within the color area 30. Within this area 30, therefore, an intermediate part excluding certain areas around the points 24 and 26 is the color mixture area. A part of the object having the color of this area can be regarded as the color transition area. Therefore, the color coordinate values on the color plane are obtained by computing the R, G and B signals. An in-focus detection signal is set at "1" when the computing process enters the color mixture area and at "0" when the process comes near to the color obtained in the neighborhood of the the point 24 or 26.

Figure 5:
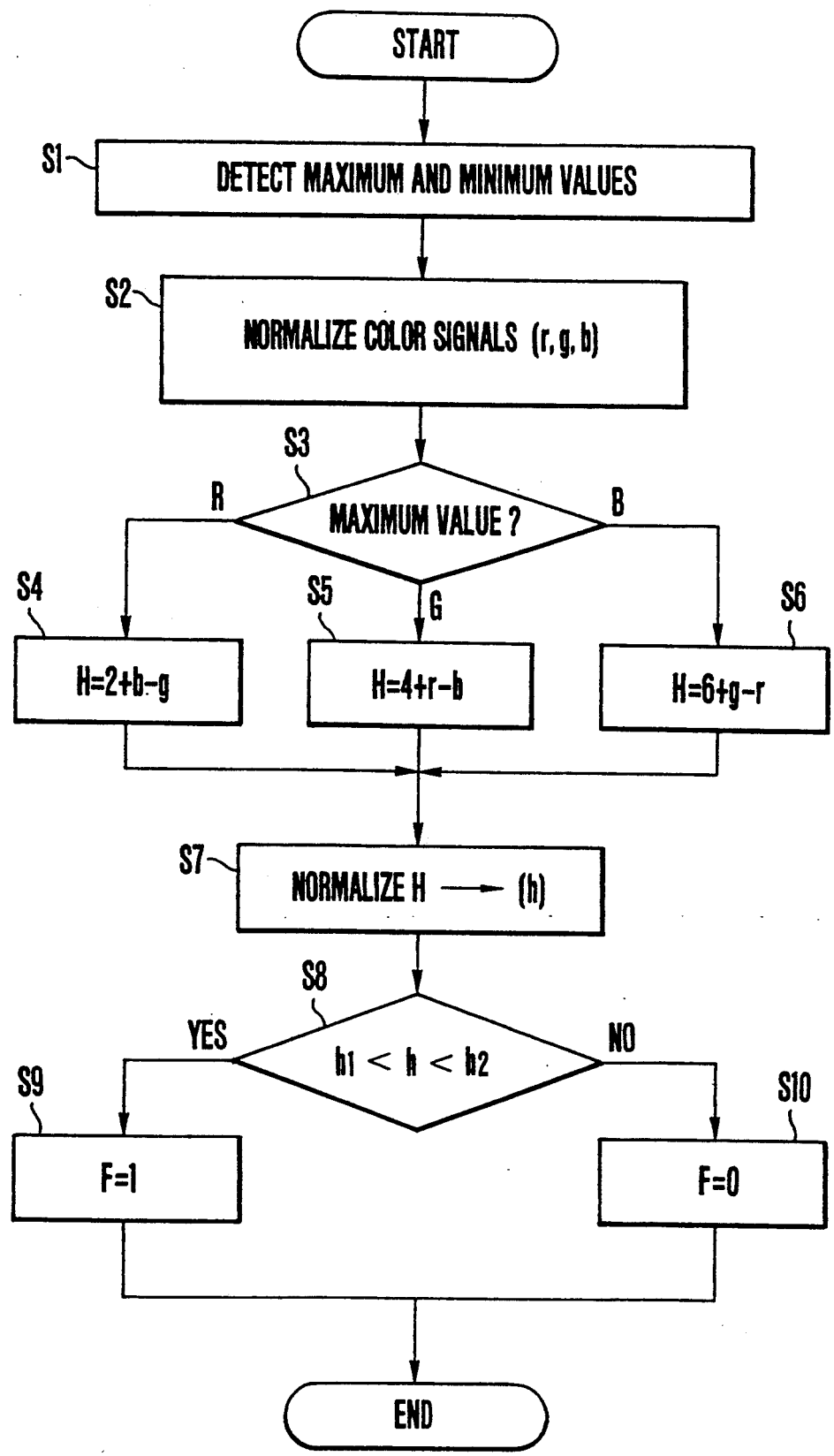
FIG. 5 is a flow chart showing a method for detecting a color mixture area by hue.

There is another method for making a discrimination between the inside and outside of the color mixture area. This method simplifies the computing process for quicker execution of it by using hues. FIG. 5 shows in a flow chart a color mixture area determining operation performed according to this method.

At a step S1 of the flow chart: The largest and the smallest of the three color signals R, G and B are first detected. At a step S2: These signals are normalized. Assuming that the color signals R, G and B are of values between "0" and "1" and that their maximum values are represented by Cmax and their minimum values by Cmin, the signals R, G and B are respectively changed to signals r, g and b by the normalizing process of the step S2. The normalizing process can be carried out, for example, in accordance with the following formula:

$$r = \frac{C_{max} - R}{C_{max} - C_{min}}$$

Step S3: The flow of operation branches to a step S4, S5 or S6 according to the color component having the largest value. At the step S4, S5 or S6: The hue H is computed in the following manner:

H=2+b−g (when the signal R is largest)
H=4+r−b (when the signal G is largest)
H=6+g−r (when the signal B is largest)

Figure 6:
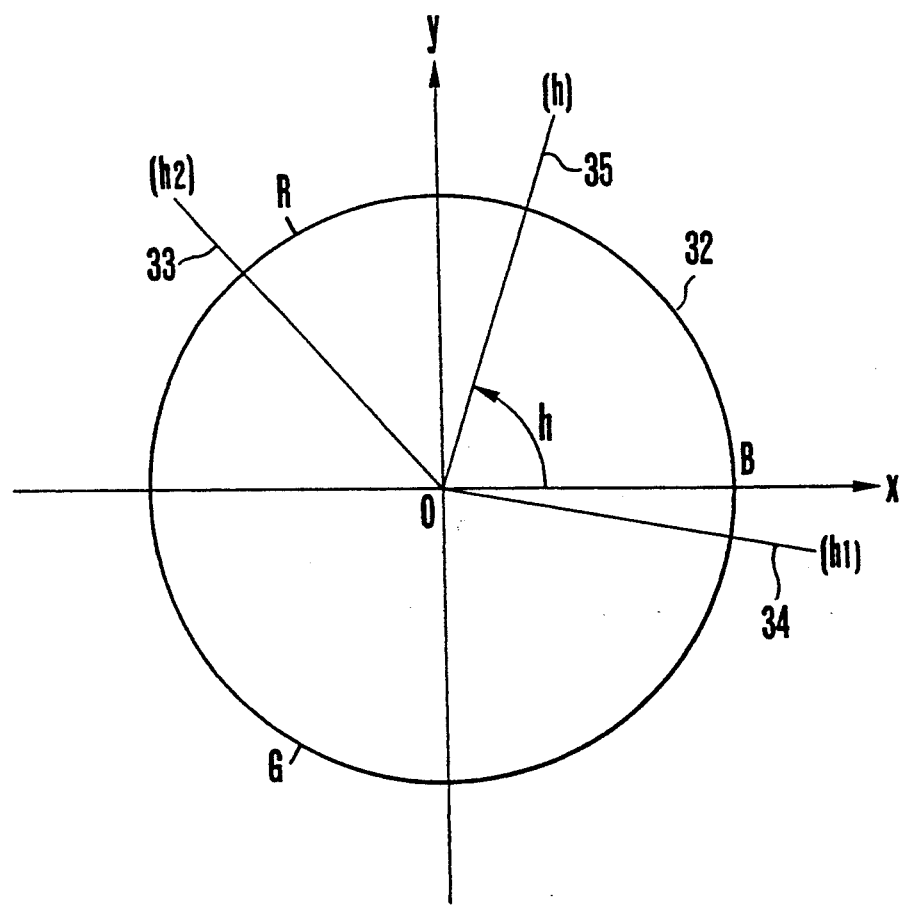
FIG. 6 shows hues.

At a step S7: The hue H is normalized, for example, in the following manner: The hue H is multiplied by 60 to obtain a hue value h (h=H×60) for indication of an angle range from 0° to 360°. After this, the following process is performed for the purpose of facilitating comparison with the hue values h1 and h2 of the colors of the areas on both sides of the color mixture area: The hue has periodicity of 360° as shown in FIG. 6. Therefore, 360 is added to or subtracted from the above-stated hue value h in such a way as to have it within an open angle smaller than an angle 180° defined by the hues h1 and h2 which are obtained on both sides.

In FIG. 6, a reference numeral 32 denotes a unit circle of radius "1" expressing the hues by phase. A numeral 33 denotes the hue of the red area 12A or 12B. A numeral 34 denotes the hue of the blue area 13A or 13B. A numeral 35 denotes the hue of the transition area 14A or 14B. The colors R (red), G (green) and B (blue) respectively have hues expressed as 120°, 240° and 360°. Further, to facilitate comparison, similar addition or subtraction is made in such a way as to make the hue h1 obtained at the beginning of the area smaller than the hue h2 obtained at the end of the area.

At a step S8: A check is made to see if the hue h which has been normalized in the above-stated manner is between the hues h1 and h2 obtained on both sides. If so, the flow comes to a step S9 to set the in-focus detection signal F at "1". If not, the flow comes to a stop S10 to set the in-focus detection signal at "0". However, in actuality, the object has subtle changes of color. In addition to that, the color signals include some noises. Therefore, at the step S8, if the hue h is slightly smaller than the hue h1 or if the hue h is slightly larger than the hue h2, the flow is preferably arranged to come to the step S9.

Figure 7:
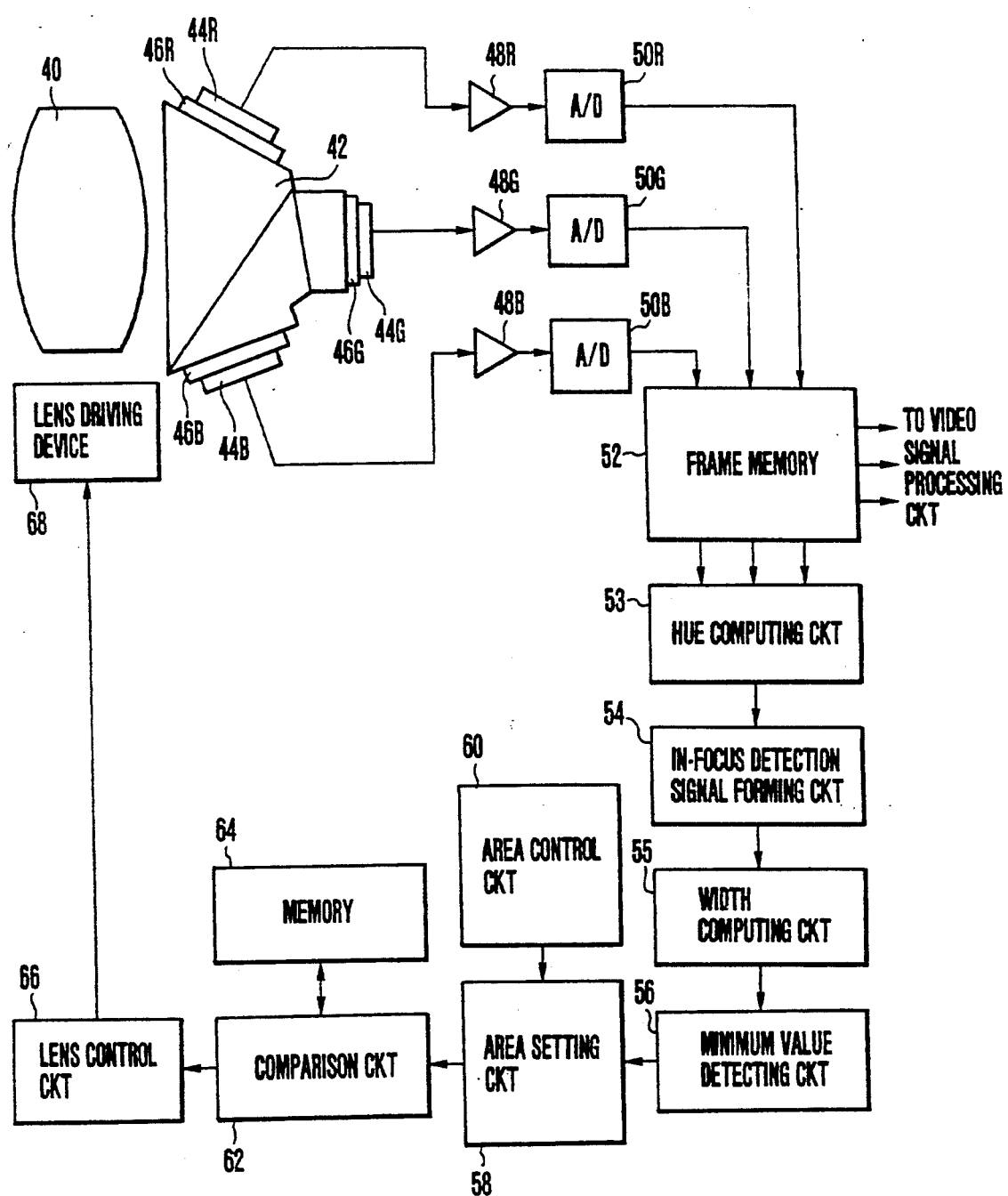
FIG. 7 is a block diagram showing the circuit arrangement of the same embodiment as applied to the automatic focusing device of a TV camera.

FIG. 7 is a block diagram showing in outline the circuit arrangement of a TV camera to which the above-stated in-focus detecting principle is applied as a first embodiment of the invention. The camera includes a phototaking lens 40; a three-color separation prism 42; solid-state image sensors 44R, 44G and 44B which are of the CCD or MOS type and are cemented to the three-color separation prism 42 through spacers 46R, 46G and 46B; amplifiers 48R, 48G and 48B which are arranged to amplify signals output from the image sensors 44R, 44G and 44B; analog-to-digital (A/D) converters 50R, 50G and 50B; and a frame memory 52.

The circuit arrangement includes a hue computing circuit 53; an in-focus detection signal forming circuit 54 which is arranged to form an in-focus detection signal from a hue value computed by the hue computing circuit 53; a width computing circuit 55 which is arranged to compute the width of the in-focus detection signal; a minimum value detecting circuit 56 which is arranged to detect the minimum value of the width computed by the circuit 55; an area setting circuit 58 which is arranged to set an area of the photographed object to be used for focus detection (in-focus detecting area); an area control circuit 60 which is arranged to compare a newly set area with a previous area and to determine whether or not the area is to be renewed; a comparison circuit 62; a memory 64; a lens control circuit 66; and a lens driving device 68 which is arranged to drive the focusing lens of the photo-taking lens 40 under the control of the lens control circuit 66.

The circuit arrangement shown in FIG. 7 operates as follows: An object image which is obtained through the photo-taking lens 40 is separated by the three-color separation prism 42 into three colors. The three color images thus obtained are respectively supplied to the image sensors 44R, 44G and 44B to be photo-electrically converted. The outputs of the image sensors 44R, 44G and 44B are amplified by the amplifiers 48R, 48G and 48B. The amplified color signals thus obtained are digitized by the A/D converters 50R, 50G and 50B. The digital signals thus obtained are stored in the frame memory 52. The signals stored in the frame memory 52 are read out from the memory 52 and supplied either to a video signal output terminal or to a video signal processing circuit (not shown) to be processed there for recording on a recording medium.

The hue computing circuit 53 reads out data for the inside of the in-focus detecting area from the frame memory 52. In accordance with the method described in the foregoing with reference to FIG. 5, the hue computing circuit 53 computes the hues of the color components R, G and B. Then, also in accordance with the method described with reference to FIG. 5, the in-focus detection signal forming circuit 54 forms an in-focus detection signal. The in-focus detection signal is supplied to the width computing circuit 55. The width computing circuit 55 then computes the width of the signal, i.e., a transition width, from the in-focus detection signal. The minimum value detecting circuit 56 detects the smallest of the width values computed by the width computing circuit 55. Further, in this instance, the circuit may be arranged to operate on the condition that the hues of fixed color parts on the two sides of the transition area must differ from each other as much as possible.

The area setting circuit 58 determines the in-focus detecting area on the basis of the detection output of the minimum value detecting circuit 56. Since the object changes within an image sensing plane, the area control circuit 60 determines selection of the area currently determined or the area already set. A transition width signal is applied via the area setting circuit 58 to the comparison circuit 62. A transition width obtained for a previous field or a previous frame is stored in the memory 64. The comparison circuit 62 compares the transition width received from the area setting circuit 58 with the data stored in the memory 64. The comparison circuit 62 then supplies a control signal to the lens control circuit 66 to cause the photo-taking lens 40 to be driven to shift its position in the same direction, if the newly supplied transition width is smaller than the previous width, or in the reverse direction in the opposite case. Further, the comparison circuit 62 writes the smaller transition width into the memory 64.

Upon receipt of the signal from the comparison circuit 62, the lens control circuit 66 drives, via the lens driving device 68, the photo-taking lens 40 in the direction designated. Further, the lens control circuit 66 may be arranged also to control the photo-taking lens shifting speed according to a degree of difference found as a result of comparison made by the comparison circuit 62. In cases where the transition width little varies or where the degree of the variation changes from a negative value to a positive value, the lens may be considered to be in an in-focus position. Therefore, in such a case, the driving action on the photo-taking lens 40 may be brought to a stop. For finer control, the memory 64 may be arranged to store data for a plurality of previous transition widths.

A relatively few number of parts are changing colors in a normal object. Therefore, with the in-focus detecting area set on the basis of color signals in the manner described above, the in-focus detecting operation more stably continues on one and the same object than in the case of the method of setting an in-focus detecting area on the basis of a monochromatic luminance signal for the edge part of an object image. Further, even in the event of a low contrast, an in-focus point is accurately detectable as long as the color changes.

As apparent from the foregoing description, an in-focus state can be accurately detected in accordance with the arrangement of this embodiment. It is another advantage of the embodiment that the in-focus detecting operation can be stably carried out on one and the same part of the object.

Figure 8A:
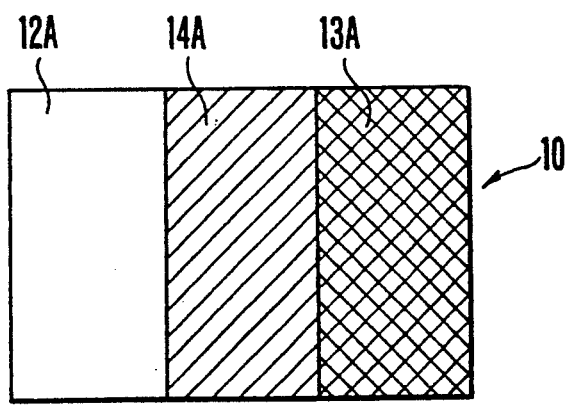
FIGS. 8A(a), 8A(b) and 8A(c) show color changing parts in a defocus state obtained by another embodiment of the invention.
Figure 8A:
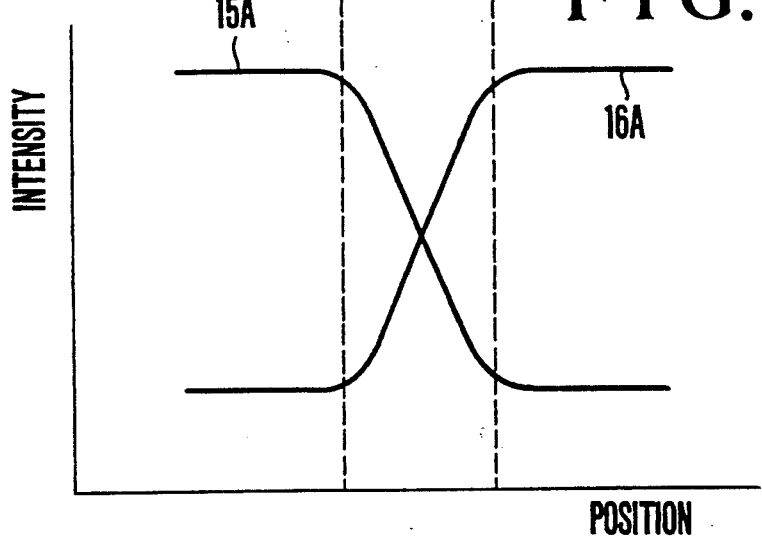
Figure 8A:
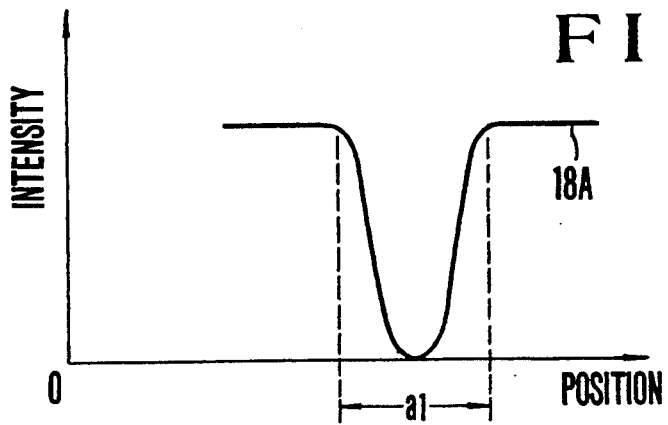

The following describes a second embodiment of the invention: The second embodiment detects the width of a color transition area in a different manner from the first embodiment. The basic principle of the embodiment is as follows: FIGS. 8A(a), 8A(b) and 8A(c) show a defocus state, and FIGS. 8B(a), 8B(b) and 8B(c) show an in-focus state. The defocus state is first described. In FIG. 8A(a), a reference numeral 10 denotes a distance measuring frame for detecting an in-focus state. Numerals 12A, 13A and 14A denote a red area, a blue area and a transition area where the color of the photographed object is changing from red to blue. These areas are color changing parts of the object, in the same manner as in the case of the first embodiment shown in FIG. 2A(a). In FIG. 8A(b), numerals 15A and 16A denote the red (R) and blue (B) signals of a video signal. These R and B signals 25A and 16A are color components of the video signal, which are obtained by horizontally scanning the red area 22A, the transition area 14A and the blue area 13A. In FIG. 8A(c), a numeral 18A denotes an in-focus detection signal which is formed by adding together the R signal 15A and the B signal 16A. The width a1 of a recessed part of the signal 18A represents the width of the transition area 14A. This width corresponds to the edge width part of the color signals and varies with the state of focus.

Figure 8B:
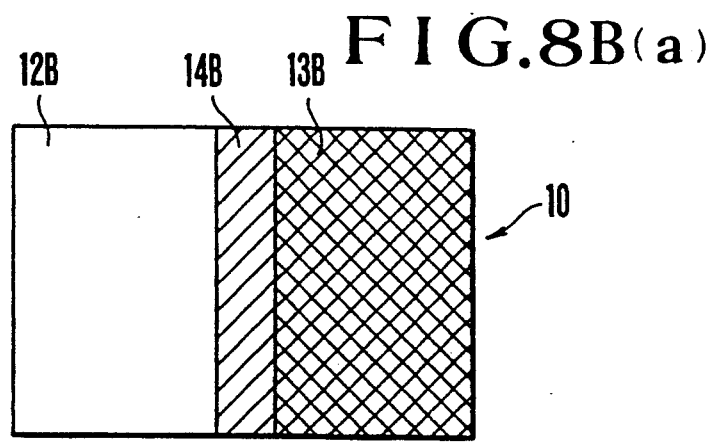
FIGS. 8B(a), 8B(b) and 8B(c) show the same color changing parts in an in-focus state.
Figure 8B:
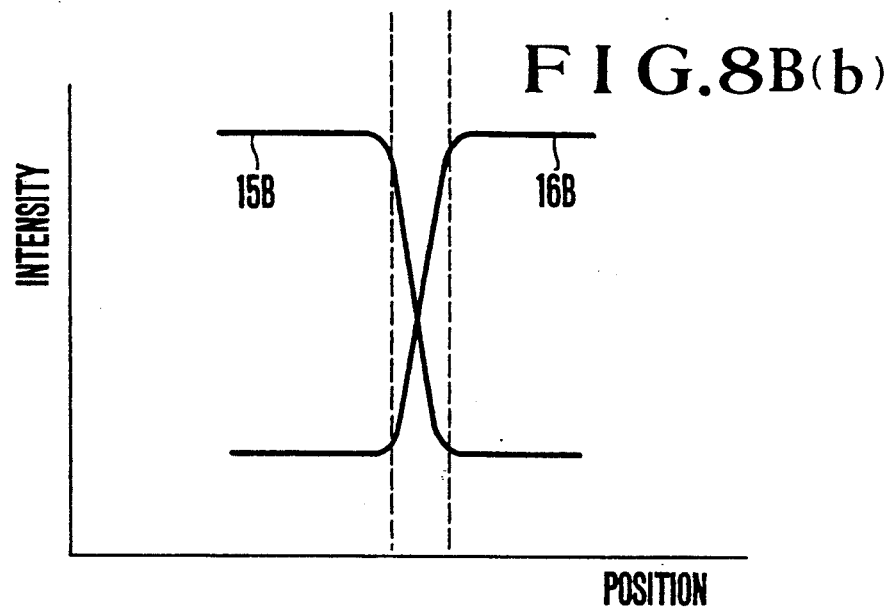
Figure 8B:
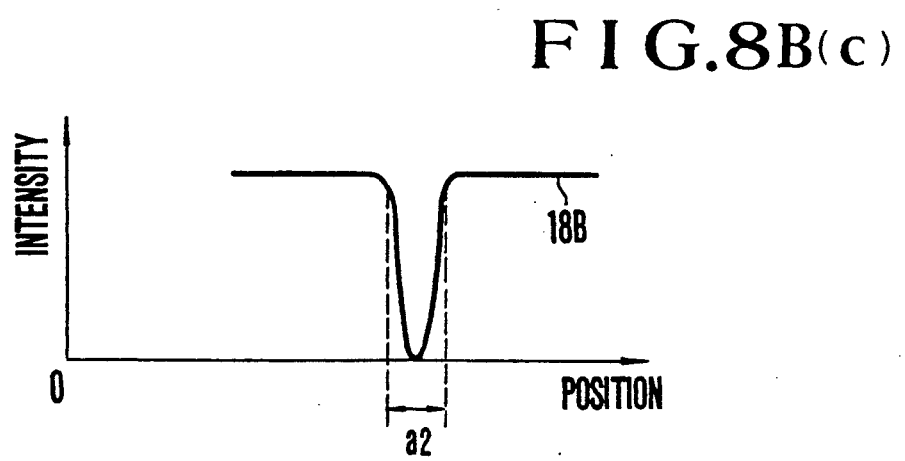

In FIGS. 8B(a), 8B(b) and 8B(c) which show an in-focus state, reference numerals 12B, 13B and 14B respectively denote a red area, a blue area and a transition area where the color changes from red to blue; numerals 15B and 16B respectively denote the red (R) and blue (B) signals of the video signal; and a numeral 18B denotes an in-focus detection signal obtained from the R and B signals 15B and 16B of FIG. 8B(b). In FIG. 8B(c), the width a2 of a recessed part of the in-focus detection signal 18B represents the width of the transition area 14B.

In taking a picture with a TV camera or the like, the video signal obtained from color changing parts of the object within the distance measuring frame 10 of the image sensing plane, such as the red area, the blue area and the transition area between them, varies for each of its color components in the same manner as a monochromatic signal obtained from its edge part. More specifically, the R signal 15A or 15B falls when it reaches the transition area 14A or 14B. Conversely, the B signal 16A or 16B rises when it comes to the transition area 14A or 14B.

With the in-focus detection signal 18A or 18B expressed as F(x), there is obtained the following relation:

$$F(x) = |R(x) - B(x)|$$

wherein "x" represents a position coordinate, "R(x)" the R signal and "B(x)" the B signal. The in-focus detection signal F(x) has a recessed part as shown in FIG. 8A(c) or 8B(c). The width of the transition area 14A or 14B corresponds to the width of this recessed part.

In an in-focus state, the degree of blur becomes small and, therefore, the width of the transition area 14A or 14B reaches a minimum value. In other words, in the case of FIGS. 8A(b) and 8B(b), the R and B signals come to steeply change at the transition area as shown in FIG. 8B(b). Therefore, an in-focus state can be attained by finding the width a1 or a2 and then by shifting the position of the photo-taking lens to a position where the width reaches its minimum value.

Figure 9:
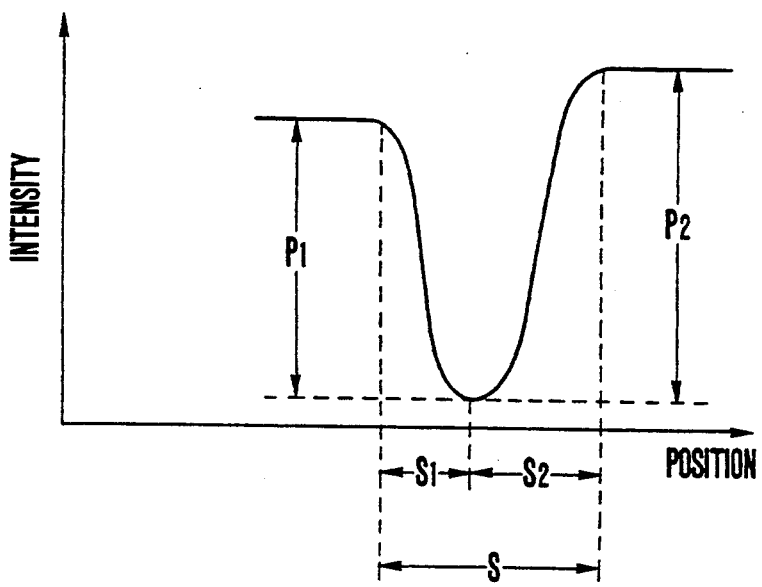
FIG. 9 shows how to compute the width of a recessed part of an in-focus detection signal.

FIG. 9 shows how to compute and obtain the width of the recessed part of the in-focus detection signal 18A or 18B. Since there is a difference in intensity between the R and B signals, the in-focus detection signal generally has asymmetrical shape as shown in FIG. 9. In finding the width of the transition area, i.e., the width S of the recessed part, a width S1 on the left side and a width S2 on the right side are individually obtained from the minimum value position of the recessed part. After that, these width values S1 and S2 are added together to obtain the width S as shown below:

$$S = S1 + S2$$

The width S1 is obtained as follows:

$$S1 = P1 / |dF(x)/dx|$$

wherein "P1" represents the depth of the recess as viewed from a flat part on the left side of the minimum value position; and "dF(x)/dx" the inclination of the recess. The mean value of the inclination of the desired part is obtained. The width S2 is likewise obtained as follows:

$$S2\ P2 / |dF(x)/dx|$$

wherein "P2" represents the depth of the recess as viewed from a flat part on the right side of the minimum value position; and "dF(x)/dx" the inclination of the recess.

The asymmetry of the recessed part can be lessened to a negligible degree by normalizing the R and B signals to equalize their intensity values. In that instance, only the width of one side of the recessed part may be computed and a value obtained by doubling the computed value may be used as the width of the recessed part. It is also possible to determine an in-focus or defocus state on the basis of the value of only one of the two sides.

Figure 10:
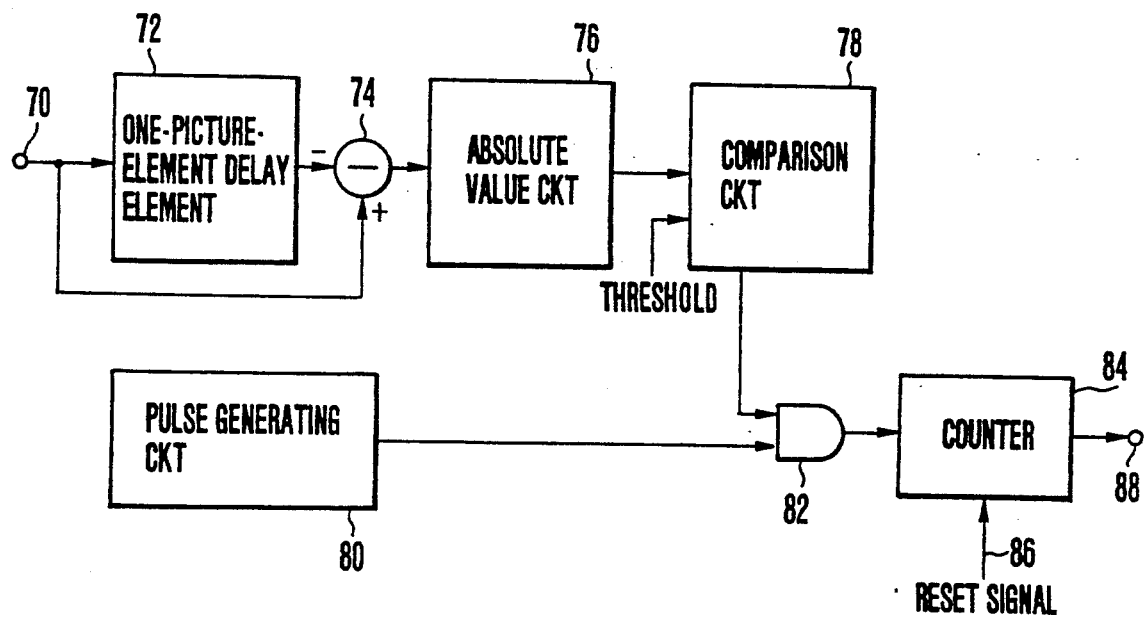
FIG. 10 is a block diagram showing the circuit arrangement for computing the width of the recessed part of the in-focus detection signal.

FIG. 10 shows by way of example a circuit arrangement for computing the width of the recessed part. Referring to FIG. 10, the in-focus detection signal 18A or 18B shown in FIG. 8A(c) or 8B(c) is supplied to an input terminal 70. A reference numeral 72 denotes a one-picture element delay element. A subtracter 74 is arranged to subtract a delayed signal output from the delay element 72 from the in-focus detection signal supplied to the input terminal 70. The circuit arrangement includes an absolute value circuit 76; a comparison circuit 78; a pulse generating circuit 80 which is arranged to generate a clock pulse signal of a given frequency; an AND circuit 82; and a counter 84 which counts the pulses output from the AND circuit 82. A numeral 86 denotes a reset signal for resetting the counter 84. A numeral 88 denotes an output terminal which outputs a signal representing the computed value of the width of a recess which indicates an in-focus state.

A degree of change taking place between the picture elements in the in-focus detection signal supplied to the input terminal 70 is obtained through the one-picture element delay element 72 and the subtraction circuit 74. The absolute value of the degree of change between the picture elements is obtained by the absolute value circuit 76. The comparison circuit 78 compares the output of the absolute value circuit 76 with an internal threshold value and, produces a signal of logic "1" to the AND circuit 82 if the degree of change is equal to or greater than the internal threshold value and a signal of logic "0" if the degree of change is less than the internal threshold value. The AND circuit 82 is thus arranged to pass the pulse output of the pulse generating circuit 80 for an image part having a degree of change between picture elements above the internal threshold value and supplies it to the counter 84. The counter 84 counts the clock pulses coming from the AND circuit 82. The result of count is output from the output terminal 88 as a recess width signal. The signal of the output terminal 88 is sent to an in-focus determining circuit which is not shown. When the in-focus detection signal coming to the input terminal 70 is renewed, the counter 84 is reset by the reset signal 86. After that, the operation described above is repeated.

FIGS. 11(a), 11(b) and 11(c) show in a timing chart the timing of the recess width computing operation of the circuit arrangement shown in FIG. 10. FIG. 11(a) shows the in-focus detection signal coming to the input terminal 70, FIG. 11(b) the output of the comparison circuit 78 and FIG. 11(c) the output of the AND circuit 82.

The embodiment is described above as being arranged to perform in-focus detection with the color of the object assumed to change from red to blue. However, the in-focus detecting operation, of course, can be performed likewise for any other colors. Further, the arrangement described may be changed to omit the absolute value circuit 76 and to have the comparison circuit 78 arranged to detect whether the signal is going down to the bottom of the recessed part or coming up from the bottom through the plus or minus sign of the degree of change between picture elements and then to control the AND circuit 82 to open or close it according to the result of the detection.

FIG. 12 is a block diagram showing in outline the circuit arrangement of a TV camera to which the above-stated in-focus detection principle is applied. In FIG. 12, the same component parts as those of FIG. 7 are indicated by the same reference numerals and the details of them are omitted from the following description.

Referring to FIG. 12, an in-focus detection signal forming circuit 90 is arranged to form an in-focus detection signal, according to the algorithm of the above-stated in-focus detecting method, from image data stored in a frame memory 52. A width computing circuit 92 is arranged to compute the width of the recessed part of the in-focus detection signal output from the in-focus detection signal forming circuit 90.

The circuit arrangement shown in FIG. 12 operates as follows: An object image formed by the photo-taking lens 40 is separated into three colors by the three-color separation prism 42. The separated color images are photo-electrically converted by the image sensors 44R, 44G and 44B. The outputs of these image sensors 44R, 44G and 44B are amplified by the amplifiers 48R, 48G and 48B and are then digitized by the A/D converters 50R, 50G and 50B. The digital signals thus output from these converters are stored in the frame memory 52. The signals stored in the frame memory 52 are read out and sent to either a video signal output terminal or to a video signal processing circuit which is not shown for recording on a recording medium.

The in-focus detection signal forming circuit 90 forms in-focus detection signals for combinations of colors from the color components of a video signal stored in the frame memory. In other words, three signals are formed for $|R(x)-G(x)|$, $|G(x)-B(x)|$ and $|B(x)-R(x)|$. The width computing circuit 92 then computes the width of the recess or that of the transition area from these three signals in accordance with the method described above. The minimum value detecting circuit 56 detects the smallest of the width values which are obtained from within the distance measuring area and computed by the width computing circuit 92. In other words, the position of the object and the combination of colors where the color is most steeply changing are determined.

In the case of FIG. 12, a signal value most suited for in-focus detection is obtained in this manner by using all the color signals R, G and B.

The area setting circuit 58 determines an in-focus detecting area on the basis of the detection output of the minimum value detecting circuit 56. Since the position within the image sensing plane of the object varies, the area control circuit 60 determines which of the currently determined area and the previously determined area is to be selected. Then, a transition width signal is applied via the area setting circuit 58 to the comparison circuit 62. The memory 64 stores either the transition width of the previous field or that of the previous frame. Therefore, the comparison circuit 62 compares the transition width which is received from the area setting circuit 58 with the stored data of the memory 64 (previous transition width). After that, the comparison circuit 62 sends to the lens control circuit 66 a control signal which causes the photo taking lens 40 to be driven in the same direction, if the newly received transition width is found to be smaller than the previous one, or a control signal which causes the lens 40 to be driven in the reverse direction in the opposite case. The comparison circuit 62 is further arranged to write into the memory 64 the data of the smaller transition width.

In accordance with the control signal output from the comparison circuit 62, the lens control circuit 66 drives, through the lens driving circuit 68, the phototaking lens 40 in the direction designated by the control signal. The lens control circuit 66 may be also arranged to control the moving speed of the photo-taking lens 40 according to a difference value obtained as the result of comparison made by the comparison circuit 62. Further, in cases where the degree of change of the transition width is very small or where the degree of change shifts from a negative value to a positive value, an in-focus state can be considered to have been attained. In that instance, therefore, the driving action on the photo-taking lens 40 may be brought to a stop. For finer control, the memory 64 is preferably arranged to store data for a plurality of transition width values previously obtained.

Generally, a normal object has a relatively few parts changing colors in the same manner. Therefore, compared with the method of setting the in-focus detecting area on the basis of a monochromatic luminance signal obtained for an edge part, the arrangement of this embodiment to set the in-focus detection area on the basis of the color signals permits the in-focus detecting operation to more stably continue for one and the same photographed object. In addition to this advantage, the in-focus point can be accurately detected even in the event of low contrast as long as the colors are changing.

In obtaining the in-focus detection signal, this embodiment is arranged to generate the recess through the absolute value obtaining process. However, this process is not absolutely necessary. An in-focus state can be determined on the basis of simply varying part of a signal representing a difference between the color signals.

As apparent from the foregoing, the embodiment can accurately and stably perform the in-focus detecting operation on one and the same part of the object.

What is claimed is:

1. An in-focus detecting device comprising:
   a) detecting means for detecting a width of a color transition area of a photographed object on the basis of color components of a video signal obtained from said color transition area; and
   b) in-focus determining means for determining an in-focus state on the basis of an output of said detecting means.

2. A device according to claim 1, wherein said color transition area is an area in which a single color varies.

3. A device according to claim 1, wherein said detecting means is arranged to detect an edge width of color signal included in said video signal.

4. A device according to claim 3, wherein said detecting means includes pulse generating means arranged to generate a pulse signal corresponding to the width of said color transition area, and wherein said determining means is arranged to determine an in-focus state on the basis of a width of said pulse signal.

5. A device according to claim 4, wherein said determining means is arranged to determine that an in-focus state is attained when the width of said color transition area represented by the width of said pulse signal is at a minimum value.

6. A device according to claim 1, wherein said color transition area is an area in which a plurality of pieces of color information are mixed in color.

7. A device according to claim 6, wherein said color information includes R, G and B signals included in said video signal.

8. A device according to claim 7, wherein said detecting means is arranged to normalize color information signals by using minimum and maximum values of said R, G and B signals.

9. A television camera comprising:
   a) image sensing means for sensing an image of a photographed object and for producing an image sensing signal;
   b) detecting means for detecting, from said image sensing signal, color information obtained from a color transition area in which a color of the object varies; and
   c) determining means for determining an in-focus state on the basis of an output of said detecting means.

10. A camera according to claim 9, wherein said detecting means includes pulse generating means for generating a pulse signal corresponding to a width of said color transition area, and wherein said determining means is arranged to determine an in-focus state on the basis of a width of said pulse signal and to determine that the infocus state is attained when the width of said color transition area represented by the width of said pulse signal reaches a minimum value thereof.

11. A camera according to claim 9, wherein said color transition area is an area in which a single color varies.

12. A camera according to claim 9, wherein said color transition area is an area in which a plurality of pieces of color information are mixed in color.

13. A camera according to claim 9, wherein said color information includes R, G and B signals included in a said image sensing signal.

14. An in-focus detecting device comprising:
a) detecting means for detecting color information from a portion of a video signal corresponding to a color transition area of an object;
b) computing means for performing a predetermined computing operation on said color information detected by said detecting means, and for producing, as a focus signal, information on a width of said color transition area which varies with an in-focus state; and
c) determining means for determining an in-focus state on the basis of a change in said information on the width of said color transition area computed by said computing means.

15. A device according to claim 14, further comprising driving means for driving and controlling a focusing lens in such a way as to cause the width of said color transition area to reach a minimum value thereof.

16. A device according to claim 14, wherein said computing means includes pulse generating means arranged to generate a pulse signal corresponding to the width of said color transition area, and wherein said determining means is arranged to determine an in-focus state on the basis of a width of said pulse signal.

17. A device according to claim 16, wherein said computing means is arranged to compute the width of said color transition area of the object by adding together a plurality of color signals obtained from said color transition area.

18. A device according to claim 16, wherein said determining means is arranged to determine that an in-focus state is attained when the width of said color transition area represented by the width of said pulse signal reaches a minimum value thereof.

19. A video camera apparatus comprising:
a) image sensing means for sensing an image of a photographed object and for producing an image sensing signal;
b) memory means for storing one picture amount of said image sensing signal produced by said image sensing means;
c) detecting means for detecting, from said image sensing signal through said memory means, color signal information obtained from a color transition area in which a color of the object varies;
d) computing means for computing, on the basis of an output of said detecting means, information on a width of said color transition area; and
e) focus adjusting means for adjusting focus according to said information on the width output from said computing means.

20. An apparatus according to claim 19, wherein said memory means is a frame memory.

21. An apparatus according to claim 19, wherein said detecting means is arranged to detect an edge width of a part of said image sensing signal in which color signals of said image sensing signal varies.

22. An apparatus according to claim 19, wherein said color transition area is an area in which a plurality of pieces of color information are mixed in color.

23. An apparatus according to claim 19, wherein said computing means includes pulse generating means arranged to generate a pulse signal corresponding to the width of said color transition area, and wherein said determining means is arranged to determine an in-focus state on the basis of a width of said pulse signal.

24. An apparatus according to claim 23, wherein said focus adjusting means is arranged to drive a focusing lens in such a way as to cause the width of said color transition area represented by the width of said pulse signal to reach a minimum value thereof.

* * * * *

UNITED STATES PATENT AND TRADEMARK OFFICE
CERTIFICATE OF CORRECTION

PATENT NO.  : 5,192,998
DATED       : March 9, 1993
INVENTOR(S) : Jun Tokumitsu, et al.

It is certified that error appears in the above-identified patent and that said Letters Patent is hereby corrected as shown below:

Col. 1, line 28        Change "etc.." to -- etc. --

Col. 1, line 30        Change "moderately varies" to --
                             varies moderately --

Col. 2, lines 25,
       29, 34          Change "irrespectively" to -- irrespective--

Col. 8, line 19        Change "25A" to -- 15A --

Col. 8, line 21        Change "22A" to -- 12A --

Col. 9, line 28        Change "S2 P2" to -- S2=P2 --

Col. 14, line 25       Change "varies" to -- vary --

Signed and Sealed this

Seventh Day of December, 1993

*Attest:*

BRUCE LEHMAN

*Attesting Officer*    Commissioner of Patents and Trademarks